US009897721B2

(12) United States Patent
Fei et al.

(10) Patent No.: US 9,897,721 B2
(45) Date of Patent: Feb. 20, 2018

(54) CLUSTER ANALYSIS FOR SELECTING RESERVOIR MODELS FROM MULTIPLE GEOLOGICAL REALIZATIONS

(71) Applicant: Landmark Graphics Corporation, Houston, TX (US)

(72) Inventors: Jin Fei, Houston, TX (US); Genbao Shi, Sugar Land, TX (US); Jeffrey Marc Yarus, Houston, TX (US); Richard L. Chambers, Yukon, OK (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 14/904,648

(22) PCT Filed: Mar. 24, 2015

(86) PCT No.: PCT/US2015/022134
§ 371 (c)(1),
(2) Date: Jan. 12, 2016

(87) PCT Pub. No.: WO2016/153482
PCT Pub. Date: Sep. 29, 2016

(65) Prior Publication Data
US 2017/0108617 A1    Apr. 20, 2017

(51) Int. Cl.
*G01V 99/00* (2009.01)
*G06F 17/16* (2006.01)
(52) U.S. Cl.
CPC ............ *G01V 99/005* (2013.01); *G06F 17/16* (2013.01); *G01V 2210/66* (2013.01)

(58) Field of Classification Search
CPC ...... G01V 1/301; G01V 99/105; G01V 11/00; G01V 17/05; G06F 17/5018; G06F 15/5018; G06T 17/05
See application file for complete search history.

(56) References Cited

U.S. PATENT DOCUMENTS 6,480,790 B1    11/2002 Calvert et al.
2012/0150501 A1    6/2012 Wu
(Continued)

FOREIGN PATENT DOCUMENTS

WO    1999064896 A1    12/1999

OTHER PUBLICATIONS

WO 2014/126650A1, "Detecting subsurface structures", Matthew casey, Aug. 21, 2014.*
(Continued)

*Primary Examiner* — Kandasamy Thangavelu
(74) *Attorney, Agent, or Firm* — McDermott Will & Emery LLP

(57) ABSTRACT

A computing device facilitates the organization of a plurality of three-dimensional geological data realizations into respective one-dimensional arrays of geological property values, with each geological property value corresponding to a three-dimensional grid location of a respective three-dimensional geological data realization. The computing device then facilitates the grouping of the one-dimensional arrays into two or more array clusters based on a comparison of geometric locations of the geological property values within the respective arrays, and selects at least one of the plurality of three-dimensional geological data realizations for each of the two or more array clusters. The selected data realizations are then provided at a user interface.

20 Claims, 5 Drawing Sheets

(56) References Cited

U.S. PATENT DOCUMENTS

| | | | |
|---|---|---|---|
| 2012/0232865 A1 | 9/2012 | Maucec et al. | |
| 2013/0118736 A1* | 5/2013 | Usadi | G06F 17/5018 |
| | | | 166/268 |
| 2013/0246031 A1* | 9/2013 | Wu | G06T 17/05 |
| | | | 703/10 |
| 2013/0275106 A1* | 10/2013 | Li | G01V 11/00 |
| | | | 703/10 |
| 2013/0346049 A1* | 12/2013 | Le Ravalec | G01V 99/005 |
| | | | 703/10 |
| 2014/0180593 A1* | 6/2014 | Schmedes | G01V 11/00 |
| | | | 702/14 |
| 2014/0225890 A1 | 8/2014 | Ronot et al. | |
| 2015/0355353 A1* | 12/2015 | Whitaker | G01V 1/301 |
| | | | 702/14 |

OTHER PUBLICATIONS

International Search Report and Written Opinion for PCT/US2015/022134 dated Dec. 10, 2015.

* cited by examiner

CLUSTER ANALYSIS FOR SELECTING RESERVOIR MODELS FROM MULTIPLE GEOLOGICAL REALIZATIONS

BACKGROUND

A virtual simulation may be performed based on a model of a geological region to assist in understanding characteristics of the geological area represented by the model. For example, with regard to a well, the virtual simulation may assist a well operator in improving production of fluids from an associated reservoir. The model of the geological region may be constructed of a grid of cells, with each of the cells being associated with one or more geological properties (e.g., porosity, permeability, etc.) that define the formation of geological structures in the region.

In conventional geological modeling, simulations are based on geological data values corresponding to the grid cells in a corresponding geological model. Because of the large number of grid cells in the model, a single simulation may take a significant amount of time and processing power. Moreover, to address uncertainty in interpreting a geological model through a simulation, a stochastic process may be used to produce multiple realizations of the same model, each with different values. Multiple simulations are then produced based on the realizations for evaluation by an operator. However, processing multiple realizations compounds the amount of time and processing power required to produce the simulations.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1A:
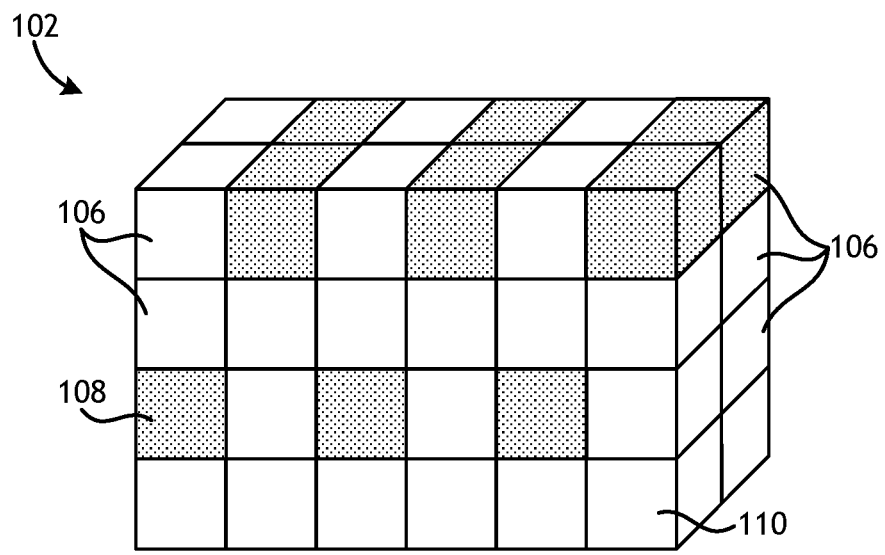
FIGS. 1A and 1B depict three-dimensional grid matrices corresponding to respective example virtual models used for simulation of a geographical area.

The detailed description set forth below is intended as a description of various configurations of the present disclosure and is not intended to represent the only configurations in which the present disclosure may be practiced. The appended drawings are incorporated herein and constitute a part of the detailed description. The detailed description includes specific details for the purpose of providing a thorough understanding of the present disclosure. However, it will be apparent that the present disclosure may be practiced without these specific details. In some instances, structures and components are shown in block diagram form in order to avoid obscuring the concepts of the present disclosure. Like components are labeled with identical element numbers for ease of understanding.

The subject technology provides various mechanisms to automatically select geological data realizations. For example, the subject technology may be used to categorize a large number of geological data realizations generated from a stochastic process into a smaller number of groups, and to facilitate the selection of the most appropriate realizations for virtual simulation. Accordingly, geological data corresponding to each geological realization is organized into a corresponding array of geological property values, with each geological property value and position in the array corresponding to grid location of the originating model structure. In one or more implementations, the geological model—e.g., a volumetric (three-dimensional) interpretation of realization data—is collapsed into a one-dimensional array according to a predetermined algorithm, with each array location representative of a coordinate space in the model. In one or more implementations, the algorithm collapses the model according to geometry so that a distance between cells in corresponding arrays may be easily calculated when each cell of the one-dimensional arrays is compared side-by-side.

In one or more implementations, the arrays corresponding to the data realizations are clustered into array groups based on comparing the geometric locations of similar values within the arrays. In this regard, the distance between like geological property values in the respective arrays may be determined. For example, an algorithm may compare a first array to other arrays by looking at a cell index within the array and determining its offset from cell indexes in other arrays holding an identical or similar value. The offset is representative of the distance between these property values in the corresponding three-dimensional models (e.g., a Euclidean distance). Arrays having identical property values (values of petro-physical properties, e.g., porosity, permeability, etc.) at the same indices or close to the same indices in the array (e.g., small offsets) may be determined to be more similar, and grouped together.

Based on the comparison of all cell property values within the arrays, degrees of similarity may be determined between the geological property values or respective arrays, and thus the data realizations. In one or more implementations, the degrees of similarity may be represented numerically (e.g., as a percentage). The number of array groups into which the arrays of geological property values are clustered may be determined based on an application of a threshold degree of similarity to the determined degrees of similarity between the arrays representing the data realizations. Accordingly, the threshold may be set by a user via a user interface, and in response the subject technology may cluster the arrays, and thus the corresponding data realizations, into a number of groups based on the threshold. For example, each group may include data realizations that are determined to be similar to each other within a degree of similarity at or above the set threshold.

The degrees of similarities may also be visually represented as a virtual tree structure (e.g., a dendogram tree) with each leaf of the tree representative of an array, and the branches of leaves representative of similar arrays. The tree structure may have multiple levels of branches. Each branch of the tree may represent a similarity between the branches and/or leafs it holds, and so on, with the degree of similarity between leafs decreasing with each successive branch toward the root of the tree. The virtual tree structure may be presented visually in a graphical user interface in connection with a graphical representation of the arrays of property values, visually arranged side-by-side. The subject technology may also automatically arrange the arrays so that similar arrays are proximate each other within the user interface. A threshold indicator may be moved up and down the branches of the tree to visually set the threshold degree of similarity used to determine which arrays are clustered into array groups. In this manner, a user may visually move the threshold indicator, and the user interface may automatically assign arrays to array groups based on the position of the indicator in the tree.

In some implementations, a geological property value at a particular array index may be expected to be similar to other property values at the same array index in other arrays, or at indices proximate the array index in the other arrays. In this regard, the subject technology may identify the degree of similarity between geological property values in cell indexes across, for example, all arrays. Clusters of cells may then be identified within the arrays based on the identified degrees of similarity between the cells. The arrays may then be separated into groups of cells in the array proximate each other based on a threshold degree of similarity set by the user. A virtual tree and threshold identifier may then be used in the same manner described previously with regard to clustering arrays to identify the size of the cell groups.

Once the cell groups are identified, the groups may be used by the previously described algorithm used to determine the similarity between arrays. In this regard, the distance between like geological property values in the respective arrays may be determined, for example, based on the cell groups instead of individual cell indexes. For example, an algorithm may compare a first array to other arrays by looking at the location and/or size of a group of cells within the array and determining which of the other arrays include similarly situated cell groups.

The clustered array groups may be visually displayed to the user, and the user may select one or more of the groups for performing a simulation. In one or more implementations, a data realization corresponding to one of the arrays within each clustered array group is selected for the simulation. In this regard, the number of data realizations on which a simulation is performed is significantly reduced, thereby reducing the time and processing power required to simulate all available realizations. The simulation representing each group may then be ranked and/or compared to observed data.

Figure 1B:
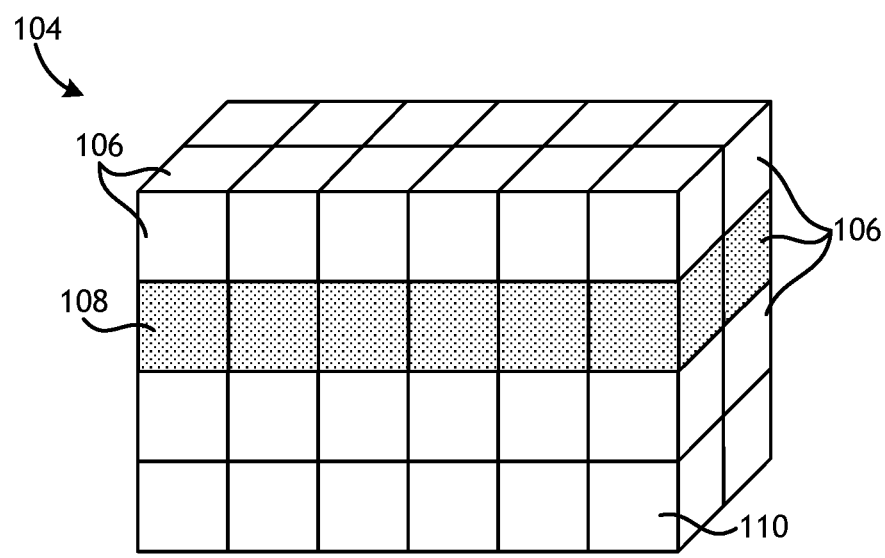

FIGS. 1A and 1B depict three-dimensional grid matrices 102, 104 corresponding to respective example virtual models used for simulation of a geographical area, according to one or more aspects of the subject technology. Each grid matrix 102, 104 may be a volumetric (three-dimensional) model of realization data. Each of the grid cells 106 that make up each matrix may correspond to a geological property value for a geological area represented by the model. For example, grid cells 106 may be populated with values corresponding to porosity so that a corresponding simulation illustrates the flow of a fluid through the geological area represented by the model. In the depicted example, the dark cells 108 are pores, while the empty cells 110 represent a non-porous medium such as rock.

In geo-statistical earth modeling (EM), there may be multiple reservoir realizations. Geologists and reservoir engineers may choose a few candidate models out of hundreds of these property realizations. The software of the subject technology selects candidate simulations from statistical analysis of reservoir volumetrics. In this regard, realizations may be ranked according to various criteria including, for example, variables that can affect volume like porosity, and permeability. The variables may be rank ordered, and reservoir candidate models chosen from the ranked distribution. In this manner, the rankings may represent key thresholds, or quantiles, of interest. The quantiles of interest may be related to the reservoir volumetrics, and the volumetrics may be related to contiguous reservoir volumes. For example, a first ten percent of the ranked realizations (P10) may represent an optimistic result with a large connected volume, and a bottom ten percent of the ranked realizations (P90) may represent a conservative result with a smaller connected volume.

Some methods may consider quantiles of a distribution but lack analysis of physical geometrical information. For example, each of the cubes depicted in FIGS. 1A and 1B are depicted as having 6*2*4 cells for a porosity simulation. Considering the dark cells 108 to be pores, both the cube of FIG. 1A and the cube of FIG. 1B may represent 12/48=0.25 pu of porosity. Using conventional volumetric analysis with a cutoff of 0.25 pu, either cube could be considered a candidate model. However, the realization of FIG. 1A has isolated pores, and there is no continuity in horizontal of vertical permeability. With regard to the cube of FIG. 1B, the horizontal permeability is higher. To select one out of two corresponding models, geologists and reservoir engineers may load both realizations and visually compare them to, for example, select the model corresponding to FIG. 1B as an optimal realization.

As will be described further, the subject technology applies clustering analysis to distinguish different realizations so as to reduce the uncertainty when selecting a candidate reservoir model for simulation.

Figure 2:
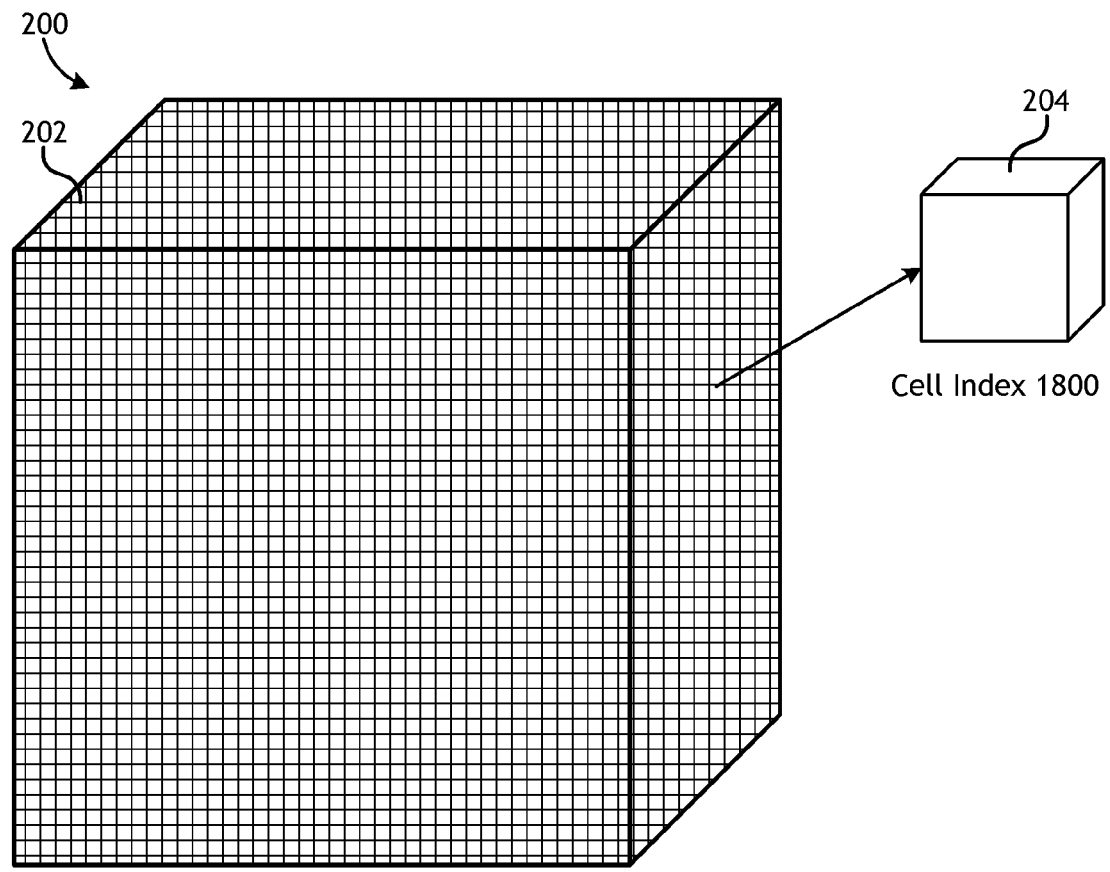
FIG. 2 depicts an example data realization of a geographical area represented by an example three-dimensional grid matrix.

FIG. 2 depicts an example data realization of a geographical area represented by an example three-dimensional grid matrix 200, according to one or more aspects of the subject technology. Each cell 202 of grid matrix 200 may represent one or more geological property values. The cells 202 may be arranged such that each cell location is at a coordinate index, for example, in three-dimensional space. Each cell may be indexed by a coordinate system, such as a Euclidean coordinate [i, j, k], that denotes the geometrical location of the cell and the geometrical location of the corresponding property value.

The subject technology organizes a geological model of a realization—e.g., grid matrix 200—into respective arrays of the geological property values represented by the model. Each index of the array may store a geological property value corresponding to a grid location of a respective grid matrix 200. In this regard, the subject technology may reshape data realizations from a first form to a second form according to a predetermined algorithm, and then compare the data from the realizations while utilizing their second forms.

In one or more implementations, the algorithm of the subject technology collapses the geological model into a one-dimensional array according to the model's geometry so that a distance between cells in corresponding arrays may be easily calculated when each cell of the one-dimensional arrays are compared. The depicted example grid matrix 200 has a volume of 50*50*50 cells. In one or more implementations, the algorithm of the subject technology may reshape the data such that the index of a cell located at coordinate [i, j, k] is translated to index k*50*50+j*50+i in a one-dimensional array. Accordingly, the example cell 204 at, for example, cell location [0, 16, 4] becomes the $1800^{th}$ element of the corresponding one dimensional array.

In one or more implementations, the Euclidean distance between a pair of realizations may be calculated. Each realization may be reshaped into a corresponding one dimension array with 50*50*50 elements, denoted by Sim_i, i being the $i^{th}$ realization. According to an example algorithm, the distance between any two realizations may be shown as:

$$\text{distance} = \Sigma_c (\text{Sim}\_i[c] - \text{Sim}\_j[c])^2, \text{ with } c \text{ being the index of the cell} \quad (1)$$

With brief reference to FIGS. 1A and 1B, if each dark area is indicative of a porosity equal to 1 and empty cells indicative of a porosity of 0 then the distance between the realization of FIG. 1A and the realization of FIG. 1B may be a value of 24, even though the respective porosities of each realization are both calculated to be 0.25 pu. Accordingly, the example algorithm indicates a real geometric difference between the two realizations, without a user having to compare them visually.

Figure 3:
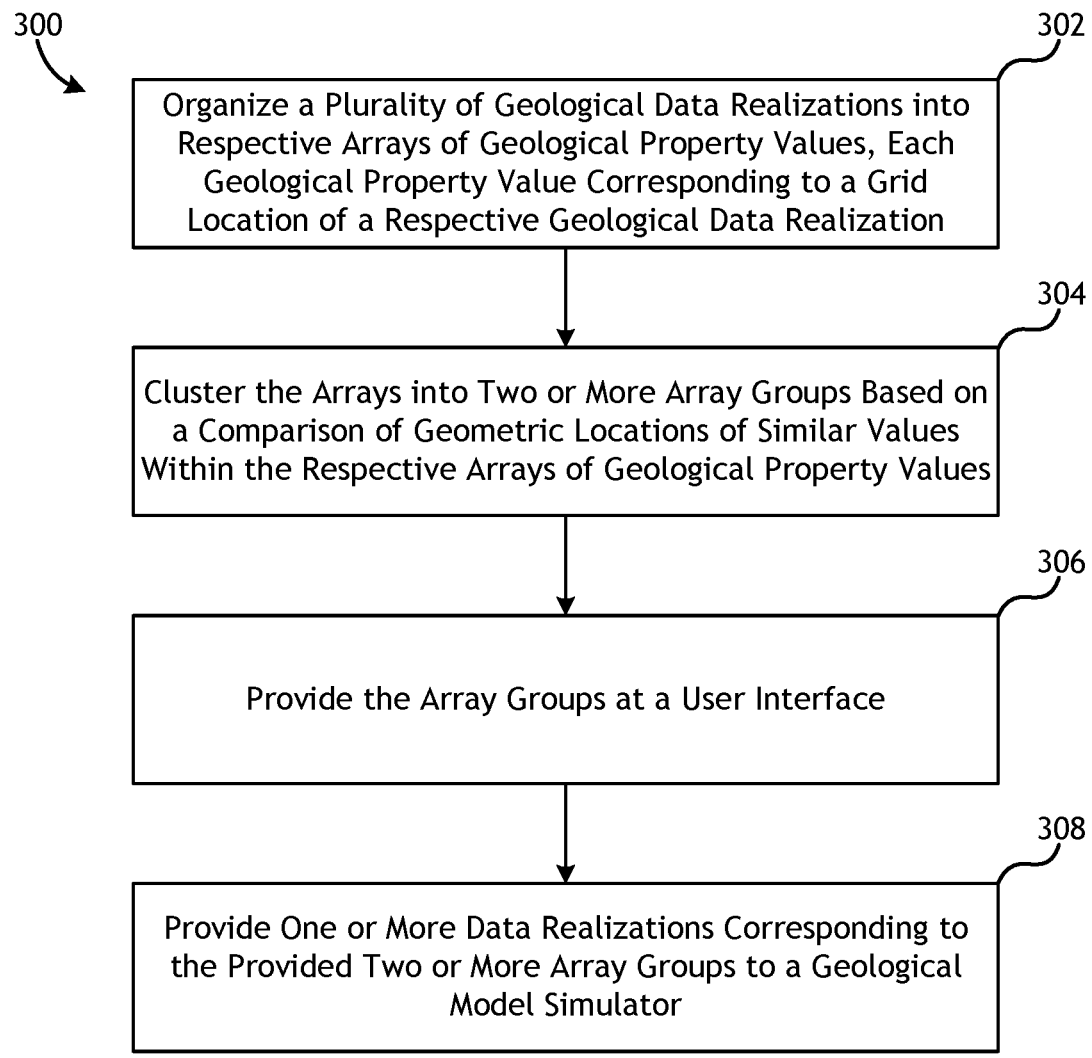
FIG. 3 depicts a flow diagram of an example process for selecting geological data realizations.

FIG. 3 depicts a flow diagram of an example process for selecting geological data realizations, according to various aspects of the subject technology. For explanatory purposes, the various blocks of example process 300 are described herein with reference to three-dimensional grid matrix 200 of FIG. 2 and the example data arrays depicted in the example user interface of FIG. 4. One or more of the blocks of process 300 may be implemented, for example, by computing device 406, including, for example, processing unit(s) 512 of FIG. 5. In some implementations, one or more of the blocks may be implemented apart from other blocks, and by one or more different processors or computing devices. Further for explanatory purposes, the blocks of example process 300 are described as occurring in serial, or linearly. However, multiple blocks of example process 300 may occur in parallel. In addition, the blocks of example process 300 need not be performed in the order shown and/or one or more of the blocks of example process 300 need not be performed.

According to example process 300, multiple geological data realizations (e.g., virtual models) are organized into respective arrays of geological property values, with each geological property value corresponding to a grid location of a respective geological data realization (302). Each of the geological data realizations may be representative of a geological area of interest, and may be a three-dimensional grid matrix 200 based on a result of a stochastical process to estimate actual geological conditions within the area. As described previously, each three-dimensional grid matrix 200 may be reshaped and collapsed into a one-dimensional array according to a predetermined algorithm. The array carries the geological location of the data, and each element of the array may maps to one single cell indexed by, for example, the cell's coordinate value (e.g., [i, j, k]).

In one or more implementations, after all the data realizations are reshaped and collapsed into arrays, the arrays are placed into a two-dimensional matrix. Each array may be represented by each respective column of the matrix, and each row of the matrix may indicate a single cell of the former three-dimensional grid matrix 200. A two-way hierarchical clustering analysis may be applied.

The arrays are clustered into two or more array groups based on a comparison of geometric locations of similar values within the respective arrays of geological property values (304). In this regard, the comparison of the geometric locations may include, for example, determining a distance between geological property values in a first one of the respective arrays and geological property values in a second one of the respective arrays. The property values may be petro-physical properties such as porosity, permeability, or total organic carbon. However, the subject technology is not limited to porosity, permeability, or total organic carbon. Any property that may populate cells of the three-dimensional grid matrix 200 may be used.

The distance may be based on some or all of the geological property values in the corresponding arrays. The distance between property values may be based on volumetric cell coordinates of the property values. For example, the distance may be a geometrical distance or distance in Euclidean space. According to various implementations of the subject technology, the overall distance between any two data realizations may be shown by previously described equation 1.

In one or more implementations, respective degrees of similarity between respective arrays of geological property values may be determined based on the foregoing comparison of property value locations. The degrees of similarity may be represented numerically, such as by a percentage, or by a virtual hierarchy. The number of array groups into which the arrays of geological property values are clustered may then be determined based on, for example, an application of a threshold degree of similarity to the determined degrees of similarity between the arrays. As will be described further with respect to FIG. 4, the threshold may be set by a user via a user interface. In this regard, once the threshold is set, each array group may include arrays that are determined to be similar to each other within a degree of similarity at or above the threshold.

In some implementations, cell clusters in respective arrays of geological property values may be identified. For example, each row of cells that traverses across the same index of all arrays in a two-dimensional matrix may be compared with other rows/indices to identify clusters of cell rows across the arrays that have similar geological property values as a whole. In this regard, respective degrees of similarity between cells at respective indices of the arrays of geological property values may be determined, and a size of the clusters determined based on an application of a threshold degree of similarity to the determined degrees of similarity between the cells. Once the clusters are identified, they may be used by the previously described algorithm used to determine the similarity between arrays. In this regard, the geometrical similarity of cell clusters within the arrays may be determined. The Euclidean distance between like geological property values in the respective arrays may be determined, for example, based on the clusters of cells of the arrays instead of individual cell indexes. For example, an algorithm may compare a first array to other arrays by looking at the location and/or size of a clusters of cells within the array and determining which of the other arrays include similarly situated clusters.

Additionally, while some examples of clustering arrays are provided, other clustering algorithms may also be in conjunction with the subject technology. Such algorithms include hierarchical clustering algorithms including, e.g., single linkage, complete linkage, and the like.

Once the array groups are determined, the array groups are provided at a user interface (306). As will be described further with respect to FIG. 4, the array groups may be presented for user selection in the user interface (e.g., in a desktop application or a webpage). Using the user interface, a geologist, engineer, or other user of the software may review the array groups and select a sample data realization from one or more of the groups for simulation in a geological simulator. The user may also use the user interface to make selections to better define the determined array groups. The clustering analysis of the subject technology, further defined through operation of the user interface, facilitates the initial determination as to what data realizations belong to each group, so that the user is not required to perform the initial determination as to which realizations are different from each other.

In one or more implementations, the subject technology may also automatically select and provide a sample data realization from each array group as a candidate selection. In this regard, the subject technology may select the data realization based on some predetermined criteria. For example, the selected array may be the first array in the group, the last array, selected randomly, or may be the closest to the mean of the group.

One or more data realizations corresponding to the provided array groups are provided to a geological model simulator, for example, to simulate a fluid flow within a geological area corresponding to the plurality of geological data realizations (308). In this regard, selected sample data realizations may be processed by a corresponding geological simulator. In one or more implementations, the software of the subject technology may operate as an interface to the simulator so that on selection of the sample data realizations, the selected sample realizations may be automatically sent to the simulator by activation of a control, for example, on the user interface.

Many of the above-described features of example process 300 and related features and applications, may be implemented as a software process specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

Figure 4:
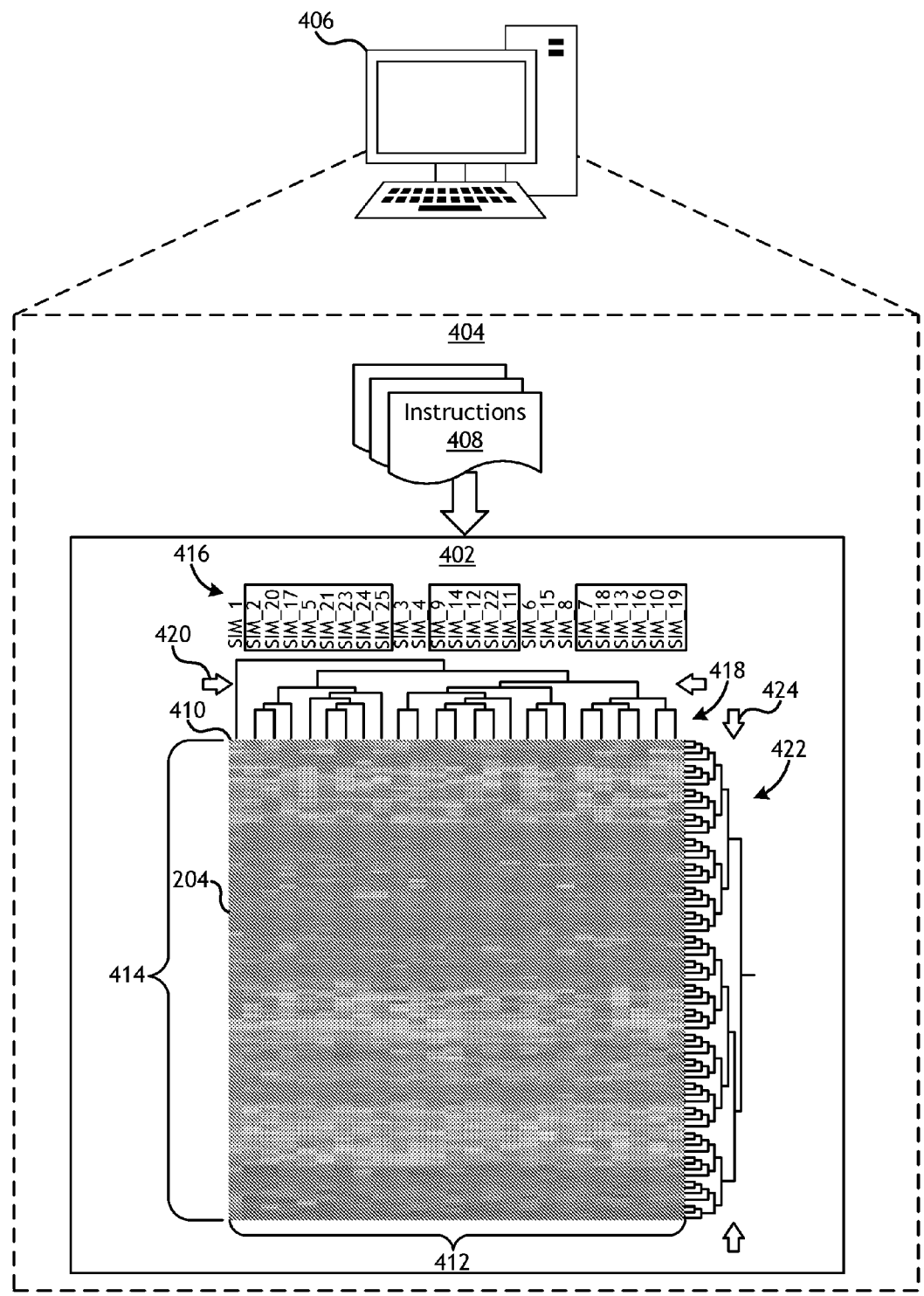
FIG. 4 depicts an example user interface for selecting geological data realizations in a dynamic runtime environment on a computing device.

FIG. 4 depicts an example user interface 402 for selecting geological data realizations in a dynamic runtime environment 404 on a computing device 406, according to one or more aspects of the subject technology. During operation of computing device 406, executable instructions 408 are loaded into runtime environment 404 and executed. Instructions 408, when executed, create user interface 402, and may perform a number of operations upon data provided for display in user interface 402. Executable instructions 408 may include properties and/or their corresponding property values that may change in response to specific user-initiated navigation paths and/or input associated with user interface 402.

Figure 5:
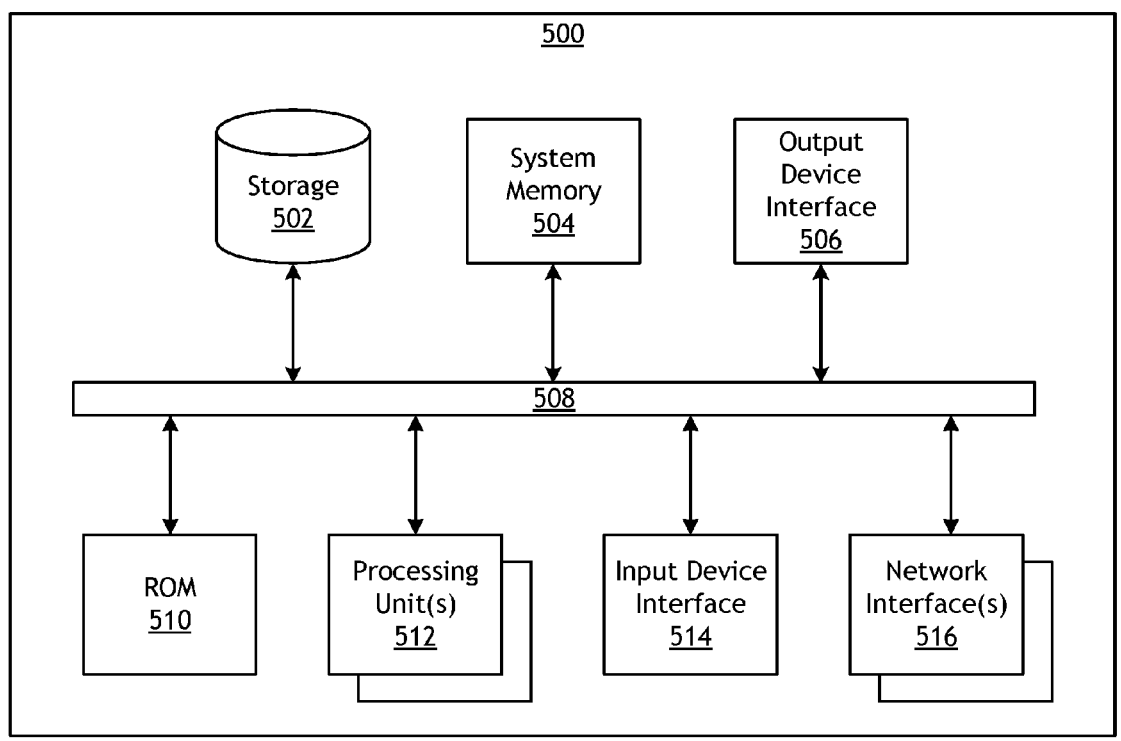
FIG. 5 is a diagram illustrating an example electronic system for use in connection with a process for selecting geological data realizations.

In one or more implementations, after all the geological data realizations are reshaped and collapsed into arrays, the arrays are placed into a two-dimensional matrix 410, which may be graphically displayed in user interface 402. The arrays of matrix 410 are represented by the respective columns 412 of the matrix, while the rows 414 of the matrix may indicate the individual cells of the arrays, each cell corresponding to a grid location of the former three-dimensional grid matrix 200. The subject technology may also automatically arrange the arrays so that similar arrays are proximate to each other based on the clustering analysis. Example matrix 410 of FIG. 5 is depicted as a heatmap that shows the clusters of porosity simulations. Each cell depicted by the heatmap may be color coded based on the value of the cell. For example, all red cells displayed in matrix 410 may have the same (or similar) property value. Twenty-five data realizations are represented in user interface 402 as side-by-side cell structures (e.g., visually represented arrays). Each of the example geological data realizations represented by the arrays is visually labeled 416 in user interface 402 as Sim_1 to Sim_25. It is understood that many more realizations may be displayed or otherwise represented by user interface.

In the depicted example, Sim_1 is represented by the first column of matrix 410 with all the grid cells that map to different groups. Example cell 204 of FIG. 1 is depicted as being mapped to one row across all arrays with, for example, the same property value at the same index in almost all the arrays (depicted, e.g., in the color red). A clustering analysis is performed on the columns (termed, e.g., "R-mode") to determine the similarity of different arrays, and thus data realizations. The results of the analysis may be graphically represented using one or more hierarchical virtual trees 418 (e.g., a dendrogram tree).

As described previously, degrees of similarity may be determined between respective arrays of geological property values based on the comparison of all cell property values within the arrays. In the depicted example, the degrees of similarities between arrays are visually represented by tree 418 with each leaf of the tree representative of a respective array, and the branches of leaves representative of similar arrays. Example tree 418 has multiple levels of branches, with each branch representing a similarity between the branches and/or leafs it holds, and so on, and with the degree of similarity between leafs decreasing with each successive branch toward the root of the tree.

In some implementations, a threshold indicator 420 may be moved up and down the branches of the tree to visually set the threshold degree of similarity used to determine which arrays are clustered into array groups. In this manner, a user may visually move threshold indicator 420, and the user interface may automatically assign arrays to array groups based on the position of the indicator in the tree.

Using user interface 402 (and, e.g., threshold indicator 420), a geologist can select realization candidates by following the hierarchies of tree 418. At the top level of the tree, Sim_1 is in a first cluster, the rest of the data realizations form a second cluster. Sim_1 may be selected as a candidate model. If it is necessary to choose another candidate, the user may traverse tree 418 to the next level or branch of the tree. As described previously, a sample realization may be selected from a cluster formed using cluster analysis of the subject technology. In the depicted example, Sim_2 can be randomly selected as the second candidate from its cluster {Sim_2, Sim_20, Sim_17, Sim_5, Sim_21, Sim_23, Sim_24, Sim_25}. Similarly, Sim_3 may be selected as a third candidate from the third depicted cluster. Sim_3 and Sim_4 are located at the same distance from the root of tree 412 (e.g., indicating they are more similar to each other than other realizations of other branches). In this case, once Sim_3 is chosen, Sim_4 may not be selected.

Clustering of the rows (termed, e.g., "Q-mode") may determine groupings of different cells within the arrays. As described previously, the subject technology may identify the degree of similarity between geological property values in cell indexes across, for example, all data realizations. Clusters of cells may then be identified in the arrays based on the identified degrees of similarity between the cells. The arrays may then be separated into groups of cells proximate each other (e.g., blocks of cells) based on a threshold degree of similarity set by the user. In this regard, a second hierarchical virtual tree 422 (e.g., a dendrogram tree) may be displayed in user interface 402, for example, to the right of matrix 410. A second identifier 424 may be used in the same manner described previously with regard to clustering arrays to identify the size of the cell groups.

Once the cell clusters within the arrays are identified, the clusters may be used by the previously described algorithm used to determine the similarity between arrays. For example, the distance between like geological property values in the respective arrays may be determined (e.g., the Euclidean distance between coordinate indices), for example, based on the clusters instead of individual cell indexes. For example, an algorithm may compare a first array to other arrays by looking at the location and/or size of a cluster of cells within the array and determining which of the other arrays include similarly situated clusters.

Accordingly, user interface 402 provides a mechanism for the application of a two-way hierarchical clustering analysis upon a group of data realizations. Both types (e.g., R-mode and Q-mode) of cluster analysis may be implemented in the subject technology to, for example, evaluate both inter-group of simulations and inter-group of cells. A first type of clustering (e.g., R-mode clustering) may be used to determine and display the similarity of different data realizations (and thus, e.g., corresponding simulations), and to organize the data realizations into groups. On the other hand, a second type of clustering (e.g., Q-mode clustering) may be used to determine and display a clustering of different cells.

FIG. 5 is a diagram illustrating an example electronic system for use in connection with a process for selecting geological data realizations, according to one or more aspects of the subject technology. Electronic system 500 may be a computing device for execution of software associated with one or more portions or steps of process 300. In various implementations, electronic system 500 may be representative of computing device 406, or any other sort of electronic device.

Electronic system 500 may include various types of computer readable media and interfaces for various other types of computer readable media. In the depicted example, electronic system 500 includes a bus 508, processing unit(s) 512, a system memory 504, a read-only memory (ROM) 510, a permanent storage device 502, an input device interface 514, an output device interface 506, and one or more network interfaces 516. In some implementations, electronic system 500 may include or be integrated with other computing devices or circuitry for operation of the various components and processes previously described.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through network interfaces 516. Network interfaces 516 may include, for example, a wireless access point (e.g., Bluetooth or WiFi). Network interfaces 516 may also include hardware (e.g., Ethernet hardware) for connecting the computer to a part of a network of computers such as a local area network ("LAN"), a wide area network ("WAN"), or an Intranet, or a network of networks, such as the Internet. Any or all components of electronic system 500 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

To facilitate a better understanding of the present disclosure, the following examples of preferred or representative embodiments are given. In no way should the following examples be read to limit, or to define, the scope of the disclosure Embodiments disclosed herein include:

A. A method for selecting geological data realizations, comprising organizing a plurality of geological data realizations into respective arrays of geological property values, each geological property value corresponding to a grid location of a respective geological data realization, clustering the arrays into two or more array groups based on a comparison of geometric locations of similar values within the respective arrays of geological property values, and providing the two or more array groups at a user interface. Other aspects include corresponding systems, apparatuses, and computer program products for implementation of the computer-implemented method.

B. A system, comprising one or more processors and a memory. The memory includes instructions that, when executed by the one or more processors, cause the one or more processors to facilitate the steps of organizing a plurality of geological data realizations into respective arrays of geological property values, each geological property value corresponding to a grid location of a respective geological data realization, clustering the arrays into two or more array groups based on a comparison of geometric locations of similar values within the respective arrays of geological property values, and providing the two or more array groups at a user interface. Other aspects include corresponding systems, apparatuses, and computer program products for implementation of the computer-implemented method. Other aspects include corresponding methods, apparatuses, and computer program products for implementation of the computer-implemented method.

C. A computer program product tangibly embodied in a computer-readable storage device and comprising instructions that, when executed by a computing device, cause the computing device to organize a plurality of three-dimensional geological data realizations into respective one-dimensional arrays of geological property values, each geological property value corresponding to a three-dimensional grid location of a respective three-dimensional geological data realization, group the one-dimensional arrays into two or more array clusters based on a comparison of geometric locations of the geological property values within the respective arrays, select at least one of the plurality of three-dimensional geological data realizations for each of the two or more array clusters, and provide the selected data realizations at a user interface. Other aspects include corresponding methods, apparatuses, and systems for implementation of the computer-implemented computer program product.

Each of embodiments A, B, and C may have one or more of the following additional elements in any combination:

Element 1: further comprising providing one or more data realizations corresponding to the provided two or more array groups to a geological model simulator to simulate fluid flow within a geological area corresponding to the plurality of geological data realizations. Element 2: further comprising automatically selecting a data realization for each of the array groups. Element 3: wherein the comparison of the geometric locations comprises determining the distance between a first geological property value in a first one of the respective arrays of geological property values and a second geological property value in a second one of the respective arrays of geological property values. Element 4: wherein the distance is based on volumetric cell coordinates of the first and second geological property values. Element 5: wherein the distance is a Euclidean distance. Element 6: further comprising determining respective degrees of similarity between respective arrays of geological property values based on the comparison of the geometric locations, and determining the number of array groups into which the arrays of geological property values are clustered based on an application of a threshold degree of similarity to the determined respective degrees of similarity between the respective arrays. Element 7: further comprising determining respective degrees of similarity between cells at respective indices of the respective arrays based on a comparison of geological property values at the respective indices, and determining cell clusters in the respective arrays based on the determined respective degrees of similarity and a threshold degree of similarity. Element 8: wherein clustering the arrays into two or more array groups based on the comparison of geometric locations of similar values comprises determining a geometrical similarity of cell clusters within the respective arrays of geological property values. Element 9: wherein each of the plurality of geological data realizations is based on a result of a stochastical process.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the claims.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

What is claimed is:

1. A method for selecting geological data realizations, comprising:
    organizing a plurality of geological data realizations into respective arrays of geological property values, wherein each geological property value in an array is obtained from a grid location of a respective geological data realization, wherein the plurality of geological data realizations correspond to a geological area comprising a reservoir;
    clustering the arrays into two or more array groups based on a comparison of geometric locations of similar values within the respective arrays of geological property values;
    providing the two or more array groups at a user interface;
    receiving a selection of at least one array from the two or more array groups; and
    providing at least one of the plurality of geological data realizations corresponding to the selected at least one array to a geological model simulator configured to simulate fluid flow within the geological area for facilitating production of fluids from the reservoir.

2. The method of claim 1, wherein organizing a plurality of geological data realizations into respective arrays of geological property values comprises organizing a plurality of three-dimensional geological data realizations into respective one-dimensional arrays of geological property values, and the method further comprises:
    providing one or more three-dimensional data realizations corresponding to the two or more array groups to the geological model simulator to simulate the fluid flow within the geological area corresponding to the plurality of three-dimensional geological data realizations.

3. The method of claim 1, further comprising:
    automatically selecting a data realization from each of the array groups as a candidate selection based on a predetermined criteria.

4. The method of claim 1, wherein the comparison of the geometric locations comprises:
    determining a distance between a first geological property value in a first one of the respective arrays of geological property values and a second geological property value in a second one of the respective arrays of geological property values.

5. The method of claim 4, wherein the distance is based on volumetric cell coordinates of the first and second geological property values.

6. The method of claim 4, wherein the distance is a Euclidean distance.

7. The method of claim 1, further comprising:
    determining respective degrees of similarity between respective arrays of geological property values based on the comparison of the geometric locations, and
    determining a number of array groups into which the arrays of geological property values are clustered based on an application of a threshold degree of similarity to the determined respective degrees of similarity between the respective arrays.

8. The method of claim 1, further comprising:
    determining respective degrees of similarity between cells at respective indices of the respective arrays based on a comparison of geological property values at the respective indices; and
    determining cell clusters in the respective arrays based on the determined respective degrees of similarity and a threshold degree of similarity.

9. The method of claim 8, wherein clustering the arrays into two or more array groups based on the comparison of geometric locations of similar values comprises:
    determining a geometrical similarity of cell clusters within the respective arrays of geological property values.

10. The method of claim 1, wherein each of the plurality of geological data realizations is based on a result of a stochastical process.

11. A system, comprising:
    one or more processors; and
    a memory including instructions that, when executed by the one or more processors, cause the one or more processors to perform the steps of:
        organizing a plurality of geological data realizations into respective arrays of geological property values, wherein each geological property value in an array is obtained from a grid location of a respective geological data realization, wherein the plurality of geological data realizations correspond to a geological area comprising a reservoir;
        clustering the arrays into two or more array groups based on a comparison of geometric locations of similar values within the respective arrays of geological property values;
        providing the two or more array groups at a user interface;
        receiving a selection of at least one array from the two or more array groups; and
        providing the at least one of the plurality of geological data realizations corresponding to the selected at least one array to a geological model simulator configured to simulate fluid flow within the geological area for facilitating production of fluids from the reservoir.

12. The system of claim 11, wherein organizing a plurality of geological data realizations into respective arrays of geological property values comprises organizing a plurality of three-dimensional geological data realizations into respective one-dimensional arrays of geological property values, and the instructions, when executed, further cause the one or more processors to perform the step of:
    providing one or more three-dimensional data realizations corresponding to the two or more array groups to the geological model simulator to simulate the fluid flow within the geological area corresponding to the plurality of three-dimensional geological data realizations.

13. The system of claim 11, wherein the instructions, when executed, further cause the one or more processors to perform the step of:
    automatically selecting a data realization from each of the array groups as a candidate selection based on predetermined criteria.

14. The system of claim 11, wherein the comparison of the geometric locations comprises:
    determining a distance between a first geological property value in a first one of the respective arrays of geological property values and a second geological property value in a second one of the respective arrays of geological property values.

15. The system of claim 14, wherein the distance is based on volumetric cell coordinates of the first and second geological property values.

16. The system of claim 11, wherein the instructions, when executed, further cause the one or more processors to perform the steps of:
   determining respective degrees of similarity between respective arrays of geological property values based on the comparison of the geometric locations, and
   determining a number of array groups into which the arrays of geological property values are clustered based on an application of a threshold degree of similarity to the determined respective degrees of similarity between the respective arrays.

17. The system of claim 11, wherein the instructions, when executed, further cause the one or more processors to perform the steps of:
   determining respective degrees of similarity between cells at respective indices of the respective arrays based on a comparison of geological property values at the respective indices; and
   determining cell clusters in the respective arrays based on the determined respective degrees of similarity and a threshold degree of similarity.

18. The system of claim 17, wherein clustering the arrays into two or more array groups based on the comparison of geometric locations of similar values comprises:
   determining a geometrical similarity of cell clusters within the respective arrays of geological property values.

19. A computer program product tangibly embodied in a computer-readable storage device and comprising instructions that, when executed by a computing device, cause the computing device to:
   organize a plurality of three-dimensional geological data realizations into respective one-dimensional arrays of geological property values, wherein each geological property value in an array is obtained from a three-dimensional grid location of a respective three-dimensional geological data realization wherein the plurality of three-dimensional geological data realizations correspond to a geological area comprising a reservoir;
   group the one-dimensional arrays into two or more array clusters based on a comparison of geometric locations of the geological property values within the respective arrays;
   select at least one of the plurality of three-dimensional geological data realizations for each of the two or more array clusters; and
   provide the selected at least one of the three-dimensional geological data realizations to a geological model simulator configured to simulate fluid flow within the geological area for facilitating production of fluids from the reservoir.

20. The computer program product of claim 19, wherein the computer program product further comprises instructions that, when executed by the computing device, cause the computing device to:
   provide one or more three-dimensional data realizations corresponding to the two or more array groups to the geological model simulator to simulate the fluid flow within the geological area corresponding to the plurality of three-dimensional geological data realizations.

* * * * *